UNITED STATES PATENT OFFICE 2,474,796

ALKYLAMINOALKYL ESTERS OF ALICY-CLYL-ALICYCLIC CARBOXYLIC ACIDS

Marcus George Van Campen, Jr., Wyoming, and Charles Harmon Tilford, Silverton, Ohio, assignors to The Wm. S. Merrell Company, Cincinnati, Ohio, a corporation of Delaware No Drawing. Application January 31, 1946, Serial No. 644,669

8 Claims. (Cl. 260—469)

This invention relates to new esters of nitrogen base alcohols which are of therapeutic value, in general having antispasmodic action on normal smooth muscle as well as against histamine-induced, neutotropic and musculotropic spasms of the smooth muscle, marked local anesthetic action which is often a valuable adjunct to the antispasmodic activity and in many cases is sufficiently pronounced to make the compounds of value as local anesthetics, definite sedative action, the property of neutralizing the physiological action of histamine generally, indicating usefulness in combating allergies, and which, despite their physiological activity, are nevertheless quite free from undesirable side reactions, such as irritation or vasopressor effects, and have a suitably low toxicity.

The new compounds of the invention are the esters of nitrogen base alcohols, i. e., amino or quaternary ammonium alcohols, with carboxy acids having the formula:

$$RR_1COOH$$

in which R is a cyclic radical, e. g., aryl, aralkyl or alicyclic, and $R_1$ is alicyclic. Both the radicals represented by R and $R_1$ may be further substituted by other groups such as alkyl groups, amino groups, hydroxy groups, halogen atoms and the like. The radicals R and $R_1$ may be directly linked together or joined by a bridging radical, such as carbonyl (CO), methylene ($CH_2$) or the like.

The nitrogen base alcohols which are esterified to produce the new compounds of the invention include a wide range of such compounds, including primary, secondary and tertiary amino alcohols, that is, amino alcohols in which 1, 2 or 3 of the hydrogen atoms of ammonia is or are replaced by an alkyl or substituted alkyl group, including those in which the nitrogen forms a part of a heterocyclic ring structure as in the piperidine compounds, and the quaternary ammonium alcohols, including those prepared by the alkylation of tertiary amino alcohols, as by treatment with alkyl halides, e. g., ethyl bromide. The nitrogen base alcohol may contain one or more basic nitrogen, e. g., amino, groups, and one or more hydroxy groups, at least one amino or quaternary ammonium group and one hydroxyl group being necessary.

The new compounds of the invention may be prepared as free bases or as their acid addition salts, and the invention includes both forms of the new compounds. In general, for therapeutic purposes, the compounds will be used in the form of their salts, most commonly in the form of the hydrochloride. In general, the free bases are oils and the hydrochlorides are white crystalline products which are readily purified and conveniently used. Other salts, such as the phosphates, sulfates, tartrates, glycolates, levulinates, etc., may be readily prepared, as by neutralization of the free base with the selected acid, and are included within the invention. In general, because of convenience of preparation, the compounds will ordinarily be produced in the form of their salts, but these are readily converted to the free bases by treatment with an alkali such as sodium carbonate in the customary way.

A convenient way of preparing most of the new compounds is by trans- or reesterification of the corresponding simple alkyl esters of the selected carboxy acid with an amino alcohol, usually under conditions such that there is separation of liberated alcohol by distillation, using an inert solvent, such as xylene, and advantageously with the use of a catalyst, such as sodium. The reesterification proceeds smoothly and relatively good yields of the desired products are obtained. The quaternary ammonium compounds may be prepared by the alkylation of a corresponding tertiary amino ester, as with an alkyl salt, such as an alkyl bromide.

The production of new compounds of the invention will be illustrated by the following specific examples, but the invention is not limited thereto.

*Example I.—β-Diethylaminoethyl 1-phenylcyclohexanecarboxylate hydrochloride.*—155 grams of 1-phenylcyclohexanecyanide, 350 cc. of concentrated sulfuric acid and 1130 cc. of ethyl alcohol are refluxed vigorously for 48 hours. The remaining alcohol is then removed by vacuum distillation and the residue is poured into 1 liter of ice water. An oil separates which is extracted 3 times with 200 cc. portions of petroleum ether, the extracts are combined and heated on a steam bath to remove the ether. The resulting crude ester may be used directly for the reesterification operation or it may be distilled to purify it first. A mixture of the ester so obtained, 155 grams of β-diethylaminoethanol and 800 cc. of dry xylene are placed in a reaction vessel with about 2 grams of sodium. The vessel is heated in an oil bath at 150-160° C. A xylene-ethanol azeotrope distills over at about 78-82° C. over a period of 2 to 3 hours. The distillate is cooled and shaken with about 3 times its volume of water, the decrease in volume of the distillate being considered a measure of the amount of alcohol formed. When 80-90% of the theoretical amount of alcohol is obtained in the distillate the reaction mixture is subjected to vacuum distillation to remove most of the xylene and unreacted diethylaminoethanol. The residue is poured into 500 cc. of benzene which is then extracted 3 times with 500 cc. portions of water. The washed benzene layer is diluted with an equal volume of ether and alcoholic hydrochloric acid is added until the mixture is acid to Congo red. A white crystalline solid forms which is dissolved in 300-400 cc. of alcohol and diluted with ether to the point where precipitation starts. A few drops of butanone are added, the solution is cooled to −10° C., and filtered to recover the crystals which separate. The product is obtained in the form of white needles melting at 159-160° C., in good yield.

The product exhibits marked physiological activity. It is highly active as an antispasmodic, has relatively low toxicity, produces local anesthesia in low concentrations, e. g. 1%, for relatively long periods as when instilled in the eye, has low irritation when injected subcutaneously, and on administration produces sedation. It may be administered orally or parenterally.

*Example II.—β-Diethylaminoethyl 1-phenylcyclopentanecarboxylate hydrochloride.* — 1-phenylcyclopentyl cyanide is converted to the corresponding ethyl carboxylate by alcoholysis following the procedure outlined in Example I, and the ethyl ester of the 1-phenylcyclopentane carboxy acid so obtained is subjected to reesterification with β-diethylaminoethanol. The ester obtained is purified, following the procedure of Example I. The product is finally obtained as the hydrochloride in the form of white crystals melting at 139-141° C. in good yields.

The physiological properties of this product are in general similar to those of the product of Example I.

*Example III.—β-Diethylaminoethyl 1-α-naphthalenecyclopentanecarboxylate hydrochloride.—* To 300 cc. of liquid ammonia containing 0.2 gram of ferric nitrate are added 27 grams of sodium strips over a period of 30 minutes. 92 grams of α-naphthaleneacetonitrile are then added while the temperature is maintained at −40° C. 120 grams of 1,4-dibromobutane and 500 cc. of dry ether are then added over a period of 2 hours at −50° C. The ammonia is then removed by evaporation and the residue is heated on the steam bath for 2 hours. The mixture is then cooled, treated with water and extracted with 200 cc. portions of benzene. The benzene extracts are combined and distilled. At 172-5° C./0.6 mm., 81 grams of 1-naphthalenecyclopentyl cyanide are obtained. Alcoholysis of this product with sulfuric acid and ethyl alcohol followed by reesterification with β-diethylaminoethanol and working up of the product as in Example I gives the desired product as the hydrochloride in the form of crystals melting at 175-176° C.

*Example IV.—β-Dimethylaminoethyl 1-phenylcyclohexanecarboxylate hydrochloride.—*By the use of β-dimethylaminoethanol in the reesterification operation of Example I, and otherwise following the directions of that example, this product is obtained in the form of crystals melting at 176-177° C.

*Example V.—β-Dimethylaminoethyl 1-phenylcyclopentanecarboxylate hydrochloride.—*By the use of ethyl 1-phenylcyclopentanecarboxylate and β-dimethylaminoethanol, and following the procedure of Example I for the reesterification operation, this product is obtained in the form of white crystalline platelets melting at 116°-118° C.

*Example VI. — 1-Piperidino-2-hydroxy-3-(1'-phenylcyclohexanecarboxy)-propane hydrochloride.*—By the use of ethyl-1-phenylcyclohexanecarboxylate and an excess of 1-piperidino-2,3-propanediol in the reesterification operation otherwise carried out as in Example I, this monoester hydrochloride is obtained in good yields in the form of crystals melting at 141-145° C.

*Example VII. — 1 - Piperidino-2-phenylurethane-3 -(1'- phenylcyclohexanecarboxy) - propane hydrochloride.*—A mixture containing 4 parts of the free base 1 - piperidino-2-hydroxy-3-(1'-phenylcyclohexanecarboxy) - propane, obtained by converting the product of Example VI to the free base with the use of alkali, 1.6 parts of phenylisocyanate, and 80 parts of dry benzene is refluxed for 3 hours. Alcoholic hydrochloric acid is then added until the solution is acid to Congo red, and the mixture is cooled and filtered. The recovered product is recrystallized from butanone. 1.5 parts of the crystalline product melting at 162-164° C. is obtained. The filtrate is evaporated to a residue which is recrystallized from 30 parts of water. 2 parts of a second racemic modification melting at 66-69° C. are obtained.

*Example VIII.—1,3-Bis-(diethylamino)-2-(1'-phenylcyclohexanecarboxy) - propane dihydrochloride.*—1,3-Bis(diethylamino)-2-propanol and ethyl 1-phenylcyclohexanecarboxylate are heated together in xylene with sodium as a catalyst as in the preceding examples, giving the ester in the form of a dihydrochloride melting at 135-137° C.

*Example IX.—4 - (1' - Phenycyclohexanecarboxymethyl)-3,4-dimethyleneoxyoxazolidine hydrochloride.*—Reesterification of ethyl 1-phenylcyclohexanecarboxylate, using 35 parts of this ester, with 44 parts of 4-hydroxymethyl-3,4-dimethyleneoxazolidine, as in the preceding examples gives the above product as the hydrochloride melting at 166-168° C.

*Example X.—β - 1-Phenylcyclohexanecarboxy-β',β'' - dihydroxy - tert.-butylamine hydrochloride.*—7 parts of the product of the preceding example are heated with 350 parts of water for 24 hours on the steam bath with addition of water to replace that which evaporates. The water is then removed by vacuum distillation and the residue recrystallized from methanol. The product is obtained in good yield as the hydrochloride melting at 213° C.

*Example XI.—β - Diethylaminoethyl 2-phenylhydrindene - 2 - carboxylate hydrochloride. —* The alcoholysis of 2-phenylhydrindene - 2 - cyanide, following the procedure of Example I followed by reesterification of the resulting ethyl ester with β-diethylaminoethanol gives the above product melting at 158-162° C.

*Example XII.—β-Diethylaminoethyl 1-phenylcyclobutanecarboxylate hydrochloride.—*A similar procedure, but applied to 1-phenylcyclobutylcyanide, gives the above product melting at 145–146° C.

*Example XIII.—β-Diethylaminoethyl 1-phenylcyclopropanecarboxylate hydrochloride.* — A similar procedure applied to 1-phenylcyclopropylcyanide gives the above product as a hygroscopic crystalline material, the melting point of which has not been determined because of its hygroscopic nature.

*Example XIV.—β-Diethylaminoethyl-2-cyclohexylcarbonyl-Δ4-cyclohexenecarboxylate hydrochloride.*—Reesterification of ethyl 2-cyclohexylcarboxyl-Δ4-cyclohexene carboxylate with β-diethylamino ethanol gives this product, M. P. 103–108° C. Two stereoisomeric forms of this have been isolated, the higher melting having a melting point of 118–122° C. and dissolving in about 3 parts of water. The other melts at 103–108° C. and dissolves in about 3 parts of water. β-Diethylaminoethyl 2-benzoyl - Δ4 - cyclohexenecarboxylate hydrochloride, M. P. 130–133° C., is similarly obtained from ethyl 2-benzoyl-Δ4-cyclohexene carboxylate.

*Example XV.—β-Diethylaminoethyl 2-methyl-2-phenylcyclopropanecarboxylate.*—25 parts of ethyl diazoacetate in 18 parts of α-methylstyrene are refluxed for 12 hours at 130–140° C. The product is distilled, and ethyl 2-methyl-2-phenylcyclopropanecarboxylate is collected as the fraction boiling at 135–8° C./20 mm. 6 parts of this ester are refluxed with 5 parts of sodium hydroxide in 45 parts of 50% ethyl alcohol for 3 hours, after which the solution is acidified with 5% hydrochloric acid and the oil which separates is extracted with benzene. The benzene is removed under vacuum, giving 5 parts of the free acid. 4.5 parts of this acid, 9 parts of β-diethylaminoethyl chloride hydrochloride, 17 parts of 10% alcoholic sodium ethoxide, and 40 parts of isopropanol is heated 24 hours at 70° C. after which the isopropanol is removed under vacuum and the residue is treated with 50 parts of 10% sodium carbonate and extracted with benzene. The benzene extract is treated with alcoholic hydrochloric acid with precipitation of β-diethylaminoethyl 2 - methyl - 2 - phenylcyclopropanecarboxylate, which on recrystallization from butanone gives a white crystalline product melting at 78–81° C.

*Example XVI.—β-Diethylaminoethyl 1-cyclohexylcyclohexanecarboxylate hydrochloride.*—13 parts of β-diethylaminoethyl 1-phenylcyclohexanecarboxylate hydrochloride, 125 parts of glacial acetic acid and 0.3 part of Adams' catalyst are heated to 70° C. and shaken with hydrogen at 50 lbs. pressure until 90–100% of the theoretical hydrogen is absorbed. The acetic acid is then removed by distillation and the residue recrystallized from butanone, giving the above product as a crystalline hydrochloride melting at 165–6° C., in good yields. This product may also be prepared by reacting cyclohexyl bromide with cyclohexyl cyanide with the use of sodamide followed by alcoholysis and reesterification as in Example I.

*Example XVII.—β-Diethylaminoethyl 1-cyclohexylcyclopentanecarboxylate hydrochloride.* — This product is obtained by the reduction of β-diethylaminoethyl 1-phenylcyclopentanecarboxylate hydrochloride, as in Example XV. It has a melting point of 126–128° C. A similar reduction of β-diethylaminoethyl 1-phenylcyclobutanecarboxylate hydrochloride gives the corresponding cyclobutane compound as the hydrochloride melting at 124–126° C.

*Example XVIII.—β-Diethylaminoethyl 2-phenylcyclohexanecarboxylate hydrochloride.* — 27 grams of 2-phenylcyclohexanecarboxylic acid, 27 parts of concentrated sulfuric acid and 160 parts of ethyl alcohol are refluxed 24 hours. The resulting reaction mixture is then poured into 500 parts of ice water and extracted with benzene. Distillation of the resulting product gives ethyl 2-phenylcyclohexanecarboxylate in good yields, this product coming over at 98–100° C./1 mm. Reesterification of this with β-diethylaminoethanol, as in Example I, gives the above product. It melts at 75–76° C. and is hygroscopic.

*Example XIX.—β-Diethylaminoethyl 2-cyclohexylcyclohexanecarboxylate hydrochloride.*—35 parts of 2-phenylbenzoic acid, 200 parts of glacial acetic acid and 0.4 part of Adams' catalyst are shaken in a bomb with hydrogen at 50 lbs. until the theoretical amount is absorbed. The resulting 2-cyclohexylcyclohexanecarboxylic acid is converted to the ethyl ester, and then to the above hydrochloride by the reesterification procedure described in Example I using diethylaminoethanol. It melts at 105–109° C.

*Example XX. — β-Triethylammoniummethyl-1-phenylcyclohexanecarboxylate bromide.*—Treatment of β-diethylaminoethyl-1-phenylcyclohexane carboxylate with ethyl bromide gives this product, which crystallizes in white platelets, M. P. 158–160° C. Similar treatment of β-diethylaminoethyl - 1 - phenylcyclopentane carboxylate gives β - triethylammoniumethyl-1-phenylcyclopentanecarboxylate bromide, M. P. 150–152° C.

*Example XXI.—β-Diethylaminoethyl-2-cyclohexylcarbonylcyclohexanecarboxylate hydrochloride.*—Reesterification of 2-cyclohexylcarbonylcyclohexane carboxy acid ethyl ester with β-diethylaminoethanol as in the preceding examples gives this product. On resolution by customary methods, two racemic mixtures are obtained, one melting at 135–139° C., the other at 132–136° C., each dissolving in about 3 parts of water. The melting point of an approximately equal mixture is 122–126° C.

Products of the foregoing examples exhibit valuable pharmacological properties, in particular having pronounced antispasmodic action on normal smooth muscle. In addition, most of the products possess definite sedative action, in some cases sufficiently pronounced so that simultaneous administration of a sedative with them when used for antispasmodic purposes is unnecessary. The compounds also have the property of neutralizing the physiological action of histamine indicating usefulness in combatting allergies. The compounds also have usefulness as analgesics. Administration of the compounds may be oral or parenteral, and ordinarily one of the acid addition salts is used.

In addition to the compounds described in the foregoing examples which are intended primarily to describe suitable methods of preparation of the new compounds, the invention includes other nitrogen base alcohol esters of the aryl, aralkyl or cycloalkyl alicyclic, i. e., cycloalkyl or cycloalkenyl, carboxy acids, including those in which one or both of the cyclic groups of the carboxy acid are further substituted by other radicals, such as alkyl groups, chlorine or other halogen, hydroxy groups, or the like, or in which the substituent group attached to the alicyclic carboxy acid is a condensed ring structure as in the hydrindene compound, the naphthalene derivatives and similar derivatives. The alicyclic group directly linked to the carboxy group may have from three to six carbon atoms in the ring structure, and may be further substituted as previously stated.

The nitrogen base alcohol group used to esterify the carboxy acid may be derived from any one of a wide range of amino alcohols, including primary, secondary and tertiary amine derivatives, that is, compounds in which 1, 2 or 3 of the hydrogen atoms of ammonia are replaced by alkyl or alkylol groups or in which the nitrogen forms part of a ring structure as in piperidine derivatives, and may contain more than one amino group, as in the case of 1,3-bis-diethylaminopropane-2-ol, and may contain more than one alcoholiform hydroxyl group, as in the case of 1-piperidino-2,3-propanediol, as well as quaternary ammonium compounds corresponding to such tertiary amino alcohols, but with the nitrogen further substituted, as by an alkyl, alicyclic, aralkyl or aryl group. Included among the compounds of the invention are the esters of the following amino alcohols:

Diethylaminoethanol,
Dimethylaminoethanol,
1-Piperidino-2-hydroxy-propane,
1-Piperidino-2-phenylurethan-3-hydroxy-propane,
1,3-Bis-diethylamino-2-hydroxy-propane,
4-Hydroxy-3,4-dimethyleneoxy-oxazolidine,
$\beta, \beta', \beta''$-Trihydroxytertiarybutylamine,
Ethylaminoethanol,
Isopropylaminoethanol,
Diethylaminobutanol,
Dimethylaminocyclohexanol,
Diethylaminocyclopentanol,
$\beta$-Isopropylaminoethanol,
$\beta$-Isobutylaminoethanol,
$\beta$-Isopropylaminoisopropanol,
$\beta$-Ethylaminoisopropanol,
3-Isopropylaminopropanol,
Propanolamine,
Ethanolamine,
4-Hydroxypiperidine, and other amino alcohols, and the following quaternary ammonium alcohols, named in terms of their cations:

Tiethylammonium ethanol,
Diethylmethylammonium ethanol,
Ethyldimethylammonium ethanol,
1-(Methylpiperidium)-2-hydroxy-propane,
Ethyldimethylammonium cyclohexanol,
Diethylcyclohexylammonium ethanol,
Benzyldiethylammonium ethanol,
Phenyldimethylammonium ethanol, and other quaternary ammonium alcohols, with carboxy acids of the general formula $$RR_1COOH$$

in which R and $R_1$ have the significance previously stated, including, among others, such acids as 4-Phenylcyclohexanecarboxy acid,
1-(Cyclohexeneyl-1,2)-cyclohexanecarboxy acid,
1-Cyclohexylcyclohexanecarboxy acid,
2-Cyclohexylcyclohexanecarboxy acid,
4-Cyclohexylcyclohexanecarboxy acid,
1-Benzylcyclopentanecarboxy acid,
2-Methyl-1-phenylcyclopentanecarboxy acid,
1-Phenylcyclopentanecarboxy acid,
1-Cyclohexylcyclopentanecarboxy acid,
1-Cyclohexylcyclobutanecarboxy acid,
1-Phenylcyclobutanecarboxy acid,
3-Methyl-1-phenylcyclobutanecarboxy acid,
2-Methyl-2-phenylcyclopropanecarboxy acid, 
1-Phenylcyclopropanecarboxy acid,
1-alpha-Naphthalenecyclohexanecarboxy acid,
1-alpha-Naphthalenecyclopentanecarboxy acid,
2-Phenyl-2-hydrindenecarboxy acid,
2-Methyl-1-phenylcyclohexanecarboxy acid,
1-Cyclohexylcarbonylcyclohexanecarboxy acid,
2-Cyclohexylcarbonylcyclohexanecarboxy acid,
1-Benzylcyclohexanecarboxy acid,
1-Phenylcyclohexanecarboxy acid,
2-Phenylcyclohexanecarboxy acid,
2-(p-Methoxyphenyl)-$\Delta_4$-cyclohexenecarboxylic acid,
2-(3',4'-Methylenedioxyphenyl)-$\Delta_4$-cyclohexene-carboxylic acid,
2-(p-Dimethylaminophenyl)-$\Delta_4$-cyclohexene-carboxylic acid,
2-(p-Cholorphenyl)-$\Delta_4$-cyclohexenecarboxylic acid,
2-($\alpha$-Furyl)-$\Delta_4$-cyclohexenecarboxylic acid,
2-(p-Nitrophenyl)-$\Delta_4$-cyclohexenecarboxylic acid,
1-Phenyl-$\Delta_3$-cyclohexenecarboxylic acid,
1-Phenyl-$\Delta_2$-cyclohexenecarboxylic acid,
$\Delta_2$-Bicyclo(4,0,4)decene-10-carboxylic acid,
1-(p-Methoxyphenyl)cyclohexancarboxylic acid,
1-(p-Chlorophenyl)cyclohexancarboxylic acid,
2-(p-Bromobenzoyl)cyclohexancarboxylic acid,
2-(Cyclohexan-2'-one)cyclohexancarboxylic acid,
1-Phenyl-3-methoxycyclobutanecarboxylic acid,
1-Phenyl-3-methoxycyclopentanecarboxylic acid,
1-Phenyl-3-bromocyclopentanecarboxylic acid,
1-Phenyl-3-methoxycyclohexanecarboxylic acid,
1-Phenyl-3-acetoxycyclohexancarboxylic acid,
2-Phenyl-4-chloro-$\Delta_4$-cyclohexenecarboxylic acid,
2-Phenyl-4,5-dichloro-$\Delta_4$-cyclohexenecarboxylic acid,
2-Phenyl-4-ethoxy-$\Delta_4$-cyclohexenecarboxylic acid,
2-Phenyl-4,5-dimethoxy-$\Delta_4$-cyclohexenecarboxylic acid,
2-Phenyl-2-methyl-$\Delta_3$-cyclohexenecarboxy acid,
2-Phenyl-$\Delta_3$-cyclohexenecarboxy acid,
2-(2',4'-dimethoxyphenyl)-$\Delta_1$-cyclohexenecarboxy acid.

We claim:
1. Amino alcohol esters of carboxy acids of the formula

$$RR_1COOH$$

in which R and $R_1$ are alicyclic.

2. Amino alcohol esters of carboxy acids of the formula $$RR_1COOH$$

in which $R_1$ is cycloalkyl and R is alicyclic.

3. Amino alcohol esters of carboxy acids of the formula $$RR_1COOH$$

in which $R_1$ is cycloalkenyl and R is alicyclic.

4. Amino alcohol esters of carboxy acids of the formula $$RR_1COOH$$

in which R and $R_1$ are alicyclic and in which the alicyclic ring structure of $R_1$ has 5 carbon atoms.

5. Amino alcohol esters of carboxy acids of the formula $$RR_1COOH$$

in which $R_1$ is cyclopentyl and R is alicyclic.

6. Diethylaminoethanol esters of carboxy acids of the formula $$RR_1COOH$$

in which R and $R_1$ are alicyclic.

7. Diethylaminoethanol esters of carboxy acids of the formula $$RR_1COOH$$

in which $R_1$ is cyclopentyl and R is alicyclic.

8. The β-diethylaminoethyl ester of 1-cyclohexyl-cyclopentane-carboxylic acid.

MARCUS GEORGE VAN CAMPEN, Jr.
    CHARLES HARMON TILFORD.

REFERENCES CITED

The following references are of record in the file of this patent:

UNITED STATES PATENTS

| Number | Name | Date |
|---|---|---|
| 1,932,341 | Guggenheim | Oct. 24, 1933 |
| 2,219,706 | Viaud | Oct. 29, 1940 |
| 2,404,588 | Martin et al. | July 23, 1946 |

FOREIGN PATENTS

| Number | Country | Date |
|---|---|---|
| 532,943 | Great Britain | Feb. 4, 1941 |
| 536,211 | Great Britain | May 7, 1941 |

OTHER REFERENCES

Case, "J. A. C. S.", vol. 56, (1934) pp. 715–717.

Cheney et al., "J. A. C. S.", vol. 64, (1942) pp. 970–973.

Burtner et al., "J. A. C. S.", vol. 65, (1943) pp. 262–268.